United States Patent

Hamilton, II et al.

(10) Patent No.: US 9,600,320 B2
(45) Date of Patent: Mar. 21, 2017

(54) MITIGATION OF VIRTUAL MACHINE SECURITY BREACHES

(71) Applicant: International Business Machines Corporation, Armonk, NY (US)

(72) Inventors: Rick A. Hamilton, II, Charlottesville, VA (US); Jeffrey R. Hoy, Southern Pines, NC (US); Jenny S. Li, Danbury, CT (US); Shawn P. Mullen, Buda, TX (US)

(73) Assignee: International Business Machines Corporation, Armonk, NY (US)

( * ) Notice: Subject to any disclaimer, the term of this patent is extended or adjusted under 35 U.S.C. 154(b) by 98 days.

(21) Appl. No.: 14/619,140

(22) Filed: Feb. 11, 2015

(65) Prior Publication Data

US 2016/0232024 A1    Aug. 11, 2016

(51) Int. Cl.
- H04L 29/06     (2006.01)
- G06F 9/455     (2006.01)
- G06F 21/53     (2013.01)
- G06F 21/57     (2013.01)

(52) U.S. Cl.
CPC .......... *G06F 9/45558* (2013.01); *G06F 21/53* (2013.01); *G06F 21/577* (2013.01); *H04L 63/1441* (2013.01); *G06F 2009/4557* (2013.01); *G06F 2009/45587* (2013.01)

(58) Field of Classification Search
CPC ................................ G06F 21/56; H04L 63/14
See application file for complete search history.

(56) References Cited

U.S. PATENT DOCUMENTS

| | | |
|---|---|---|
| 8,555,381 B2 | 10/2013 | McLaughlin et al. |
| 8,612,743 B2 | 12/2013 | Holland et al. |
| 9,119,077 B2 | 8/2015 | Holland et al. |
| 2012/0110671 A1* | 5/2012 | Beresnevichiene ... G06F 21/577 726/25 |
| 2013/0031358 A1 | 1/2013 | Holland et al. |
| 2013/0055374 A1 | 2/2013 | Kustarz et al. |
| 2013/0238786 A1 | 9/2013 | Khesin |
| 2013/0269034 A1 | 10/2013 | Selep et al. |
| 2014/0053226 A1 | 2/2014 | Fadida et al. |
| 2014/0101656 A1 | 4/2014 | Zhu et al. |
| 2014/0143536 A1 | 5/2014 | Holland et al. |

(Continued)

FOREIGN PATENT DOCUMENTS

| | | |
|---|---|---|
| GB | 2493265 A | 1/2013 |
| WO | 2014000781 A1 | 1/2014 |

(Continued)

OTHER PUBLICATIONS

Subburaj.V et al., "Secure Localized node positioning in Mobile ad-hoc networks using PSO", 2014 World Congress on Computing and Communication Technologies, pp. 295-298, DOI 10.1109/WCCCT2014.29, © 2014 IEEE.

*Primary Examiner* — Jason K Gee
(74) *Attorney, Agent, or Firm* — Noah A. Sharkan (57) ABSTRACT

An approach provides solutions for responding to threats to virtual machines (VMs) and mitigating the risks of potential breaches to VMs that reside in the same neighborhood as VMs that are affected by threats. The approach can provide proactive responsive actions for one or more VMs in a determined neighborhood that help protect those VMs in a selective and prioritized manner.

24 Claims, 6 Drawing Sheets

(56) References Cited

U.S. PATENT DOCUMENTS

| | | | |
|---|---|---|---|
| 2014/0223556 A1* | 8/2014 | Bignon | H04L 63/1441 |
| | | | 726/22 |
| 2014/0259095 A1 | 9/2014 | Bryant | |
| 2014/0283051 A1 | 9/2014 | Doron et al. | |
| 2014/0351934 A1* | 11/2014 | Mitra | G06F 21/567 |
| | | | 726/23 |
| 2015/0237066 A1 | 8/2015 | Ponsford et al. | |
| 2015/0244640 A1 | 8/2015 | Ponsford et al. | |

FOREIGN PATENT DOCUMENTS

| | | |
|---|---|---|
| WO | 2014000787 A1 | 1/2014 |
| WO | 2014035537 A1 | 3/2014 |
| WO | 2014059438 A3 | 4/2014 |

\* cited by examiner

MITIGATION OF VIRTUAL MACHINE SECURITY BREACHES

TECHNICAL FIELD

The present invention relates generally to the field of computer system security, and more particularly to mitigation of virtual image security breaches.

BACKGROUND

Networked computing environments, such as cloud computing environments, are typically comprised of many computing nodes. Virtual machines (VMs), which are software-based emulations of computer systems, are often used in such environments as they provide efficiencies, cost savings, and scalability on account of their hardware-agnostic nature and ability to be deployed, operated, and managed in a centralized fashion.

An attack on a given computing node in a networked computing environment can present a broader threat to other computing nodes and resources that are part of that computing environment. For example, if a particular VM server is attacked and compromised in a multi-tenant cloud environment, other VMs and resources hosted on one or more of the same physical computer systems may be compromised, the hypervisor managing the compromised VM server may be compromised, or even an entire data center may be compromised.

Existing security solutions tend to focus on leveraging cloud scalability, such as parallel image run-time comparison, parallel input/output comparison, and image deviations from templates. Other emerging solutions relate to migrating virtual machines in response to an attack. For example, U.S. Patent Application Publication No. 2014/0053226 A1 to Fadida et al. (hereafter "Fadida") discloses a security coordinator that can notify active VMs in a virtualization environment that a potential attack has occurred on the virtualization environment, causing other actions to take place, such as migrating those active VMs to different environments and/or locations and changing security levels.

However, existing solutions do not adequately and proactively address the risks of potential breaches to VMs that reside in the same logical neighborhood as a VM affected by a detected threat.

SUMMARY

According to one embodiment of the present invention, a method is provided for responding to a threat affecting a virtual machine. One or more computer processors detect a threat affecting a first virtual machine and determine a neighborhood of the first virtual machine comprising one or more virtual machines that might be affected by the detected threat. One or more computer processors calculate a response factor for each virtual machine in the determined neighborhood. One or more computer processors perform a responsive action to protect a second virtual machine in the determined neighborhood from the detected threat based upon at least the calculated response factor for the second virtual machine. This embodiment provides several advantages over existing solutions. For example, this embodiment provides improved protection by identifying a neighborhood of VMs that might be affected by a detected threat and calculating response factors that can be used to prioritize proactive responsive actions to be performed for each individual VM.

According to another embodiment, one or more computer processors determine the neighborhood based upon at least logical distances between the first virtual machine and the one or more virtual machines that might be affected by the detected threat. This embodiment provides an advantage, for example, by determining the neighborhood of VMs to subject to proactive responsive actions based on logical distances, which enables criteria to be specified to define and adjust a scope of VMs to be included within such a neighborhood.

According to another embodiment, the responsive action comprises migrating the second virtual machine to another host computer system. This embodiment provides an advantage, for example, by removing the second virtual machine from the host computer system on which the affected virtual machine resides, thereby reducing the risk of the detected threat affecting the second virtual machine.

According to another embodiment, virtual machines in the determined neighborhood are migrated in a priority order based upon at least the calculated response factor for each virtual machine in the determined neighborhood. This embodiment provides an advantage, for example, by migrating the second virtual machine in a prioritized fashion relative to other virtual machines in the determined neighborhood.

According to another embodiment, the calculated response factor for each particular virtual machine reflects an urgency with which action should be taken to protect that particular virtual machine from the detected threat. This embodiment provides an advantage, for example, by prioritizing protective responses taken for virtual machines based on urgency, which can be used to prioritize responses for virtual machines that are more susceptible to the detected threat, are more valuable, or for which protection is otherwise deemed to be a high priority.

According to another embodiment, the response factor for each particular virtual machine is calculated based upon at least a logical distance between that particular virtual machine and the first virtual machine, and one or more numerical values that reflect a degree of risk of the detected threat spreading from the first virtual machine to that particular virtual machine. This embodiment provides an advantage, for example, by calculating the response factors with additional data that is based on both logical distances and numerical values that reflect risk of the detected threat spreading to other VMs.

According to another embodiment, a response factor for each virtual machine in the determined neighborhood is calculated by one or more processors calculating an urgency factor for the first virtual machine based upon at least one or more of: a value reflecting a level of confidence in one or more security alerts associated with the detected threat, a value reflecting strength of the first virtual machine, a value reflecting an ability of security controls to protect the first virtual machine, a value reflecting risk that multi-tenant security controls cannot isolate the first virtual machine, and a value reflecting elapsed time since the detected threat was detected or since the detected threat occurred. One or more processors then calculate a response factor for each particular virtual machine in the determined neighborhood based upon at least a logical distance between that particular virtual machine and the first virtual machine and the urgency factor for the first virtual machine. This embodiment provides an advantage, for example, by calculating each response factor based on both logical distance and an urgency factor that uses multiple specific considerations that reflect risk of the detected threat spreading to other VMs.

According to another embodiment, a computer program product for responding to a threat affecting a virtual machine is provided, comprising: one or more computer readable storage media and program instructions stored on the one or more computer readable storage media. The program instructions comprise: program instructions to detect a threat affecting a first virtual machine; program instructions to determine a neighborhood of the first virtual machine comprising one or more virtual machines that might be affected by the detected threat; program instructions to calculate a response factor for each virtual machine in the determined neighborhood; and program instructions to perform a responsive action to protect a second virtual machine in the determined neighborhood from the detected threat based upon at least the calculated response factor for the second virtual machine. This embodiment provides an advantage, for example, by providing a computer program product having program instructions that can be distributed to users for execution on one or more computer processors.

According to another embodiment, a system for responding to a threat affecting a virtual machine is provided, comprising: one or more computer processors; one or more computer readable storage media; and program instructions stored on the one or more computer readable storage media for execution by at least one of the one or more processors. The program instructions comprise: program instructions to detect a threat affecting a first virtual machine; program instructions to determine a neighborhood of the first virtual machine comprising one or more virtual machines that might be affected by the detected threat; program instructions to calculate a response factor for each virtual machine in the determined neighborhood; and program instructions to perform a responsive action to protect a second virtual machine in the determined neighborhood from the detected threat based upon at least the calculated response factor for the second virtual machine. This embodiment provides an option, for example, of providing a system that can be constructed and operated by one or more users.

According to another embodiment, a method for deploying a system for responding to a threat affecting a virtual machine is provided, comprising: providing a computer infrastructure being operable to: detect a threat affecting a first virtual machine; determine a neighborhood of the first virtual machine comprising one or more virtual machines that might be affected by the detected threat; calculate a response factor for each virtual machine in the determined neighborhood; and perform a responsive action to protect a second virtual machine in the determined neighborhood from the detected threat based upon at least the calculated response factor for the second virtual machine. This embodiment provides an option, for example, of providing a method for deploying such a system on behalf of one or more users.

DETAILED DESCRIPTION

Embodiments of the present invention provide solutions for detecting and mitigating the risks of potential breaches to VMs that reside in the same identified logical neighborhood as a VM affected by a detected threat. Embodiments of the present invention can detect a threat affecting one or more VMs in a computing environment, determine a logical neighborhood of VMs relative to the one or more affected VMs, assess individual impacts of threats on such neighboring VMs, and subject one or more of VMs in the neighborhood to proactive responsive actions to protect those VMs in a selective and prioritized manner that helps contain threats.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources, but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as Follows:

Software as a Service (SaaS): the capability provided to the consumer is to use the provider's applications running on a cloud infrastructure. The applications are accessible from various client devices through a thin client interface, such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure, but has control over operating systems, storage, deployed applications, and possibly limited control of select networking components (e.g., host firewalls).

Deployment Models are as Follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
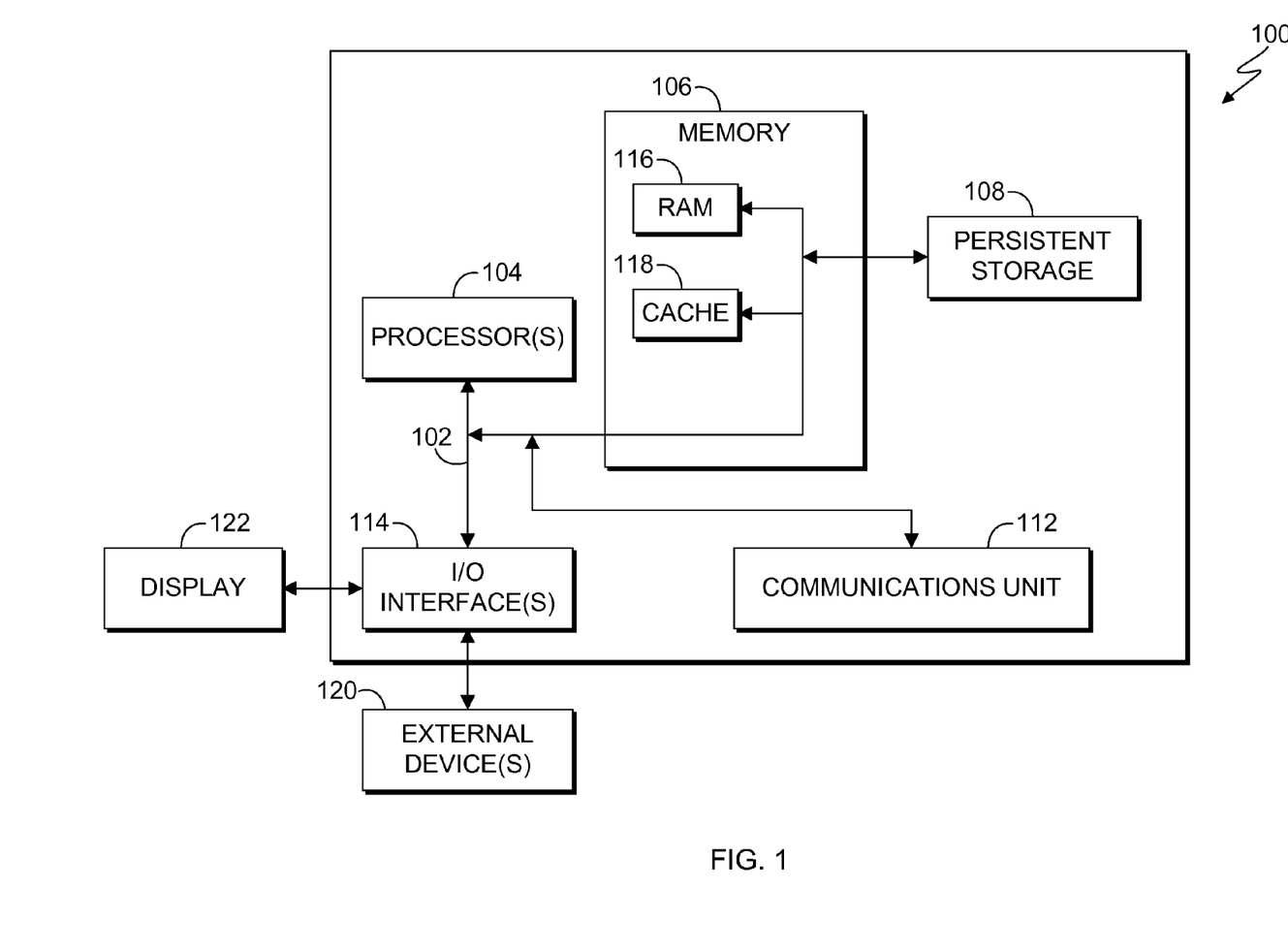
FIG. 1 depicts a computer system, in accordance with an embodiment of the present invention.

FIG. 1 is a block diagram of internal and external components of a computer system 100, in accordance with an embodiment of the present invention. It should be appreciated that FIG. 1 provides only an illustration of one implementation and does not imply any limitations with regard to the environments in which different embodiments of the present invention may be implemented. In general, the components illustrated in FIG. 1 are representative of any electronic device capable of executing machine-readable program instructions. Examples of computer systems, environments, and/or configurations that may be represented by the components illustrated in FIG. 1 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 100 may be described in the general context of computer system-executable instructions, such as program modules, being executed by a computer system. Generally, program modules may include routines, programs, objects, components, logic, data structures, and so on that perform particular tasks or implement particular abstract data types. Computer system 100 may be practiced in distributed cloud computing environments where tasks are performed by remote processing devices that are linked through a communications network. In a distributed cloud computing environment, program modules may be located in both local and remote computer system storage media including memory storage devices.

Computer system 100 includes communications fabric 102, which provides for communications between one or more processors 104, memory 106, persistent storage 108, communications unit 112, and one or more input/output (I/O) interfaces 114. Communications fabric 102 can be implemented with any architecture designed for passing data and/or control information between processors (such as microprocessors, communications and network processors, etc.), system memory, peripheral devices, and any other hardware components within a system. For example, communications fabric 102 can be implemented with one or more buses.

Memory 106 and persistent storage 108 are computer-readable storage media. In this embodiment, memory 106 includes random access memory (RAM) 116 and cache memory 118. In general, memory 106 can include any suitable volatile or non-volatile computer-readable storage media. Software is stored in persistent storage 108 for execution and/or access by one or more of the respective processors 104 via one or more memories of memory 106.

Persistent storage 108 may include, for example, a plurality of magnetic hard disk drives. Alternatively, or in addition to magnetic hard disk drives, persistent storage 108 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 108 can also be removable. For example, a removable hard drive can be used for persistent storage 108. Other examples include optical and magnetic disks, thumb drives, and smart cards that are inserted into a drive for transfer onto another computer-readable storage medium that is also part of persistent storage 108.

Communications unit 112 provides for communications with other computer systems or devices via a network. In this exemplary embodiment, communications unit 112 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to computer system 100 through communications unit 112 (e.g., via the Internet, a local area network or other wide area network). From communications unit 112, the software and data can be loaded onto persistent storage 108.

One or more I/O interfaces 114 allow for input and output of data with other devices that may be connected to computer system 100. For example, I/O interface 114 can provide a connection to one or more external devices 120 such as a keyboard, computer mouse, touch screen, virtual keyboard, touch pad, pointing device, or other human interface devices. External devices 120 can also include portable computer-readable storage media such as, for example, thumb drives, portable optical or magnetic disks, and memory cards. I/O interface 114 also connects to display 122.

Display 122 provides a mechanism to display data to a user and can be, for example, a computer monitor. Display 122 can also be an incorporated display and may function as a touch screen, such as a built-in display of a tablet computer.

Figure 2:
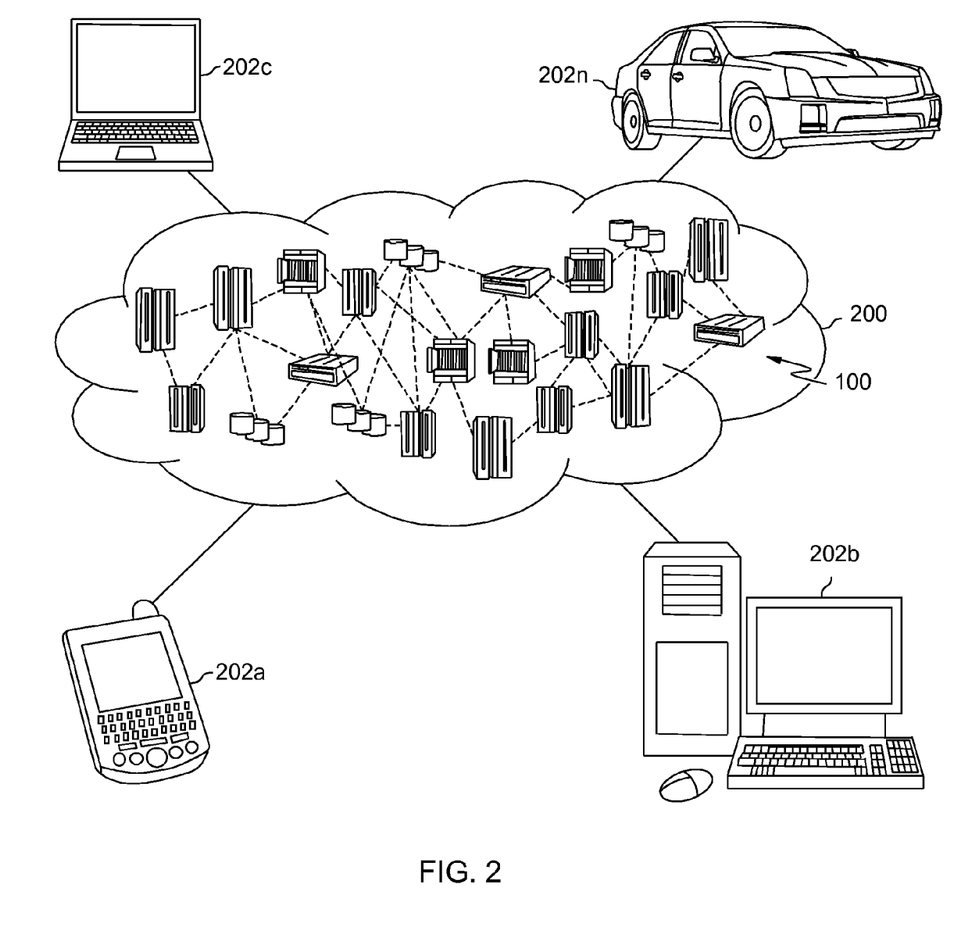
FIG. 2 depicts a cloud computing environment, in accordance with an embodiment of the present invention.

FIG. 2 depicts an illustrative cloud computing environment 200, in accordance with an embodiment of the present invention. As shown, cloud computing environment 200 comprises one or more computer systems 100 (e.g., cloud computing nodes) with which local computing devices used by cloud consumers such as, for example, personal digital assistant (PDA) or cellular telephone 202a, desktop computer 202b, laptop computer 202c, and/or automobile computer system 202n may communicate. Computer systems 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 202a-n shown in FIG. 2 are intended to be illustrative only and that computer systems 100 and cloud computing environment 200 can communicate with any type of computerized device over any type of network and/or network addressable connection (e.g., using a web browser).

Figure 3:
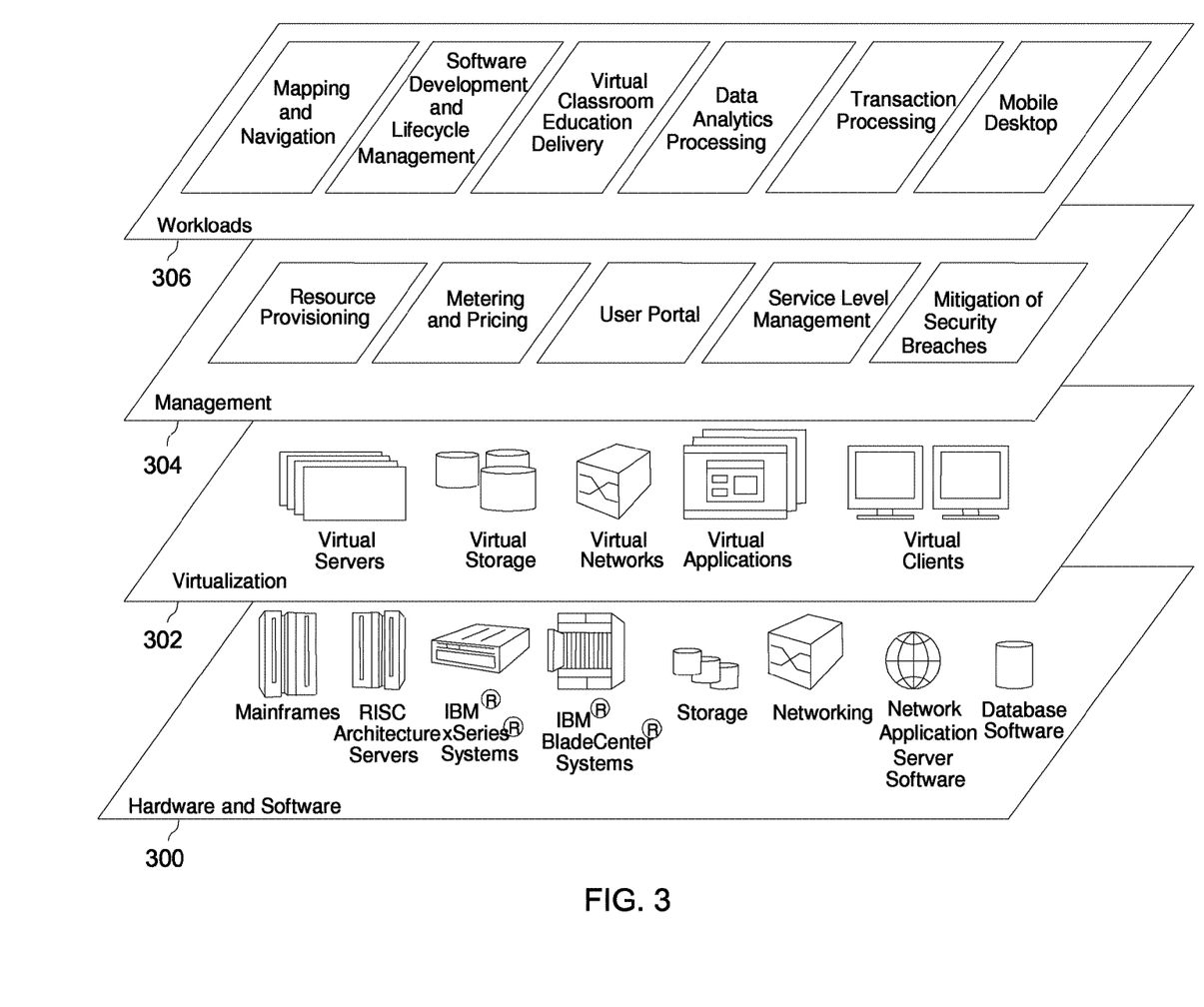
FIG. 3 depicts abstract model layers, in accordance with an embodiment of the present invention.

FIG. 3 depicts a set of functional abstraction layers provided by cloud computing environment 200 (FIG. 2). It should be understood in advance that the components, layers, and functions shown in FIG. 3 are intended to be illustrative only and embodiments of the invention are not limited thereto. As depicted, the following layers and corresponding functions are provided:

Hardware and software layer 300 includes hardware and software components. Examples of hardware components include mainframes, in one example IBM® zSeries® systems; RISC (Reduced Instruction Set Computer) architecture based servers, in one example IBM pSeries® systems; IBM xSeries® systems; IBM BladeCenter® systems; storage devices; networks and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation registered in many jurisdictions worldwide).

Virtualization layer 302 provides an abstraction layer from which the following examples of virtual entities may be provided: virtual servers; virtual storage; virtual networks, including virtual private networks; virtual applications and operating systems; and virtual clients.

In one example, management layer 304 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Mitigation of security breaches provides ways to detect security breaches in the cloud computing environment and mitigate risk of breaches spreading within the cloud computing environment.

Workloads layer 306 provides examples of functionality for which the cloud computing environment may be utilized. Examples of workloads and functions which may be provided from this layer include: mapping and navigation; software development and lifecycle management; virtual classroom education delivery; data analytics processing; transaction processing; and mobile desktops.

Figure 4:
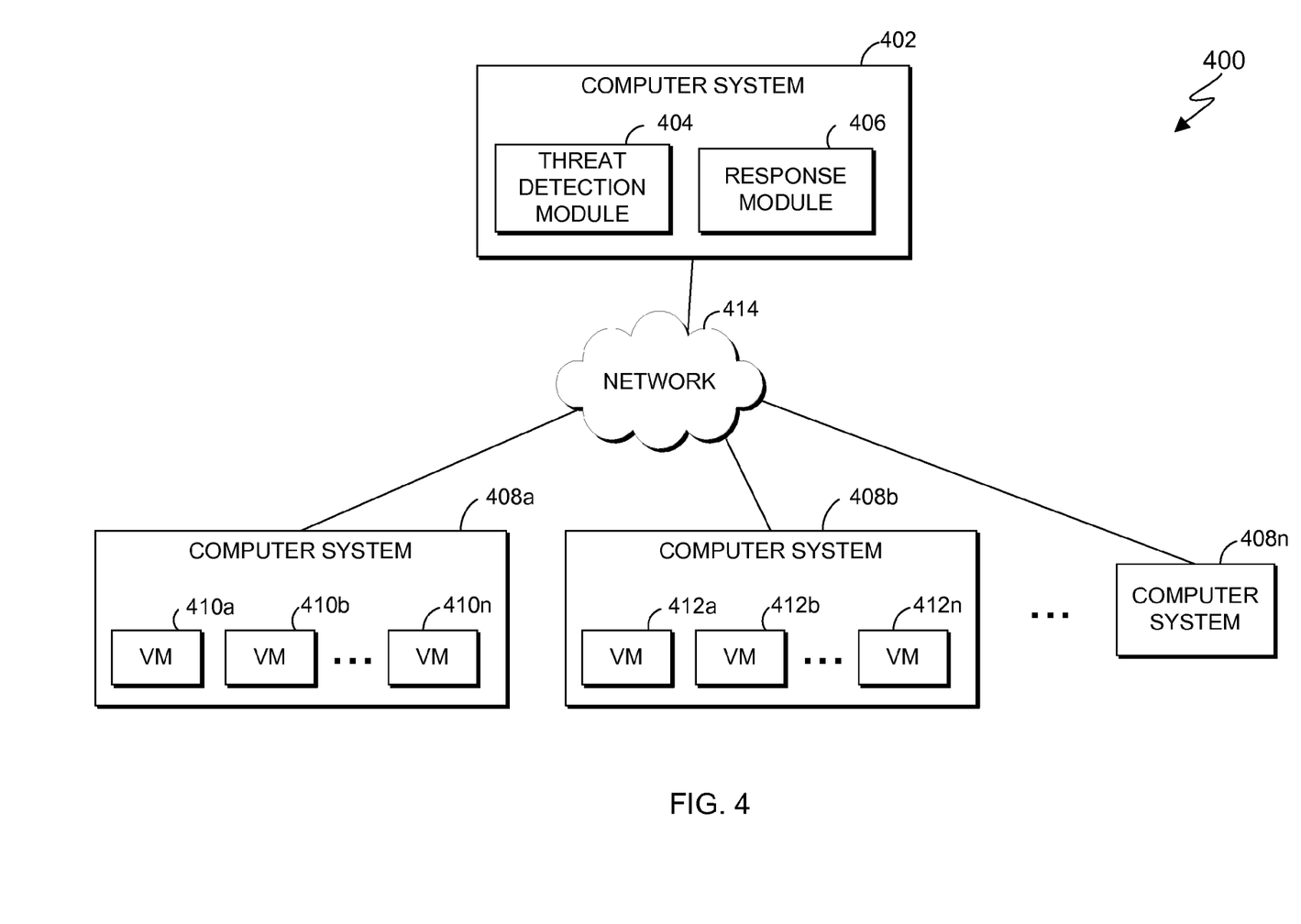
FIG. 4 depicts a computing environment, in accordance with an embodiment of the present invention.

FIG. 4 depicts a computing environment 400, in accordance with an embodiment of the present invention. Computing environment 400 includes computer systems 402 and 408a-408n, all interconnected via network 414. As shown, computing environment 400 can include additional computer systems. Computing environment 400 can be, for example, any networked computing environment comprising a local area network (LAN), a wide area network (WAN), and/or combinations thereof, such as a portion of cloud computing environment 200.

Computer systems 402 and 408a-n can be desktop computers, laptop computers, specialized computer servers, or any other computer systems known in the art. In certain embodiments, computer systems 402 and 408a-n represent computer systems utilizing clustered computers and components to act as a single pool of seamless resources when accessed through network 414. For example, such embodiments may be used in data center, cloud computing, storage area network (SAN), and network attached storage (NAS) applications, such as part of cloud computing environment 200. In certain embodiments, for example, computer systems 402 and 408a-n comprise part of hardware and software layer 300. In general, computer systems 402 and 408a-n are representative of any electronic devices, combination of electronic devices, or virtualization thereof, capable of executing machine-readable program instructions, as described with regard to FIG. 1.

Computer system 402 includes threat detection module 404 and response module 406. Threat detection module 404 detects and assesses threats to computer systems and other resources within computing environment 400. In this embodiment, such computer systems and resources comprise computer systems 408a-n, along with VMs 410a-n and VMs 412a-n. The term "threat", as used herein, refers generally to any detectable breach of security or potential for such breach. For example, threats can include vulnerabilities that have been or could be exploited, unauthorized access and/or modifications to computer systems, suspicious network activity, etc. In this embodiment, threat detection module 404 comprises one or more software programs and/or services. For example, threat detection module 404 can be implemented with known security information and event management (SIEM) technology, such as IBM® Security QRadar® SIEM, available from International Business Machines of Armonk, N.Y. Threat detection module 404 can be operated in a manual and/or automated fashion to detect threats. For example, an administrative user can monitor a security console provided by threat detection module 404 to view logs and real-time reports of activity in computing environment 400 and identify threats, or a user can manually enter, categorize, and catalog threats (e.g., application-level, VM-level, hypervisor-level, network-level, etc.). In another example, threat detection module 404 can be configured to provide alerts in response to detecting certain activity and conditions indicative of threats. In yet another example, whether in an automated fashion or during a manual audit by a user, threat detection module 404 can be used to detect threats indicated by network activity (e.g., inbound, outbound, hostile, etc.), data leakage or data leak prevention tools, trusted platform module (TPM) remote attestation integrity checking, and/or validation of security components by comparisons of current configurations to prescribed configurations and baseline security policies.

Response module 406 responds to threats detected by threat detection module 404 in order to contain, remedy, and/or mitigate damage or potential damage resulting from detected threats. In certain embodiments, as discussed in greater detail later in this specification, response module 406 can isolate affected VMs (e.g., one or more of VMs 410a-n and VMs 412a-n), determine a neighborhood of potentially affected VMs, prioritize VMs in the neighborhood, and proactively migrate workloads to different VMs and/or VMs to different host computer systems (e.g., computer systems 408a-n ) to prevent or mitigate damage to VMs and/or host computer systems. In other embodiments, threat detection module 404 and/or response module 406 can reside on other computer systems, such as one or more of computer systems 408a-n.

In this embodiment, computing environment 400 comprises a plurality of computer systems 408a-n. Computer system 408a is a host computer system for VMs 410a-n. That is, computer system 408a, in conjunction with one or more hypervisors (not shown), can instantiate and operate any number of VMs 410a-n. Similarly, computer system 408b is a host computer system for VMs 412a-n. VMs 410a-n and VMs 412a-n each represent software-based emulations of computer systems. For example, VMs 410a-n and VMs 412a-n can be virtualized servers that host web services. In certain embodiments, VMs 410a-n and 412a-n comprise part of virtualization layer 302.

VMs 410a-n and VMs 412a-n can be operated independent from, or in conjunction with, each other. For example, one or more of VMs 410a-n can be used for processing tasks of a first user or application while one or more of VMs 412a-n are used for processing tasks of another user or application. In another example, one or more of VMs 410a-n and one or more of VMs 412a-n can be used together (e.g., parallel processing) for processing tasks of one or more common users or applications. In general, any combinations of VMs hosted by computer systems 408a-n can be used for any desired processing tasks.

Network 414 can be, for example, a local area network (LAN), a wide area network (WAN) such as the Internet, or a combination of the two, and include wired, wireless, or fiber optic connections. As previously discussed, in certain embodiments, network 414 can be part of a larger cloud computing environment, such as cloud computing environment 200. In general, network 414 can be any combination of connections and protocols that will support communications between computer system 402 and computer systems 408a-n, in accordance with a desired embodiment of the present invention.

It should be understood that, for illustrative purposes, FIG. 4 does not show other computer systems and elements which may be present when implementing embodiments of the present invention. For example, one or more of computer systems 408a-n can include additional resources for which a threat can be detected and on which one or more proactive responsive actions can be performed, such as hypervisors, host operating systems, memory, and storage devices.

Figure 5:
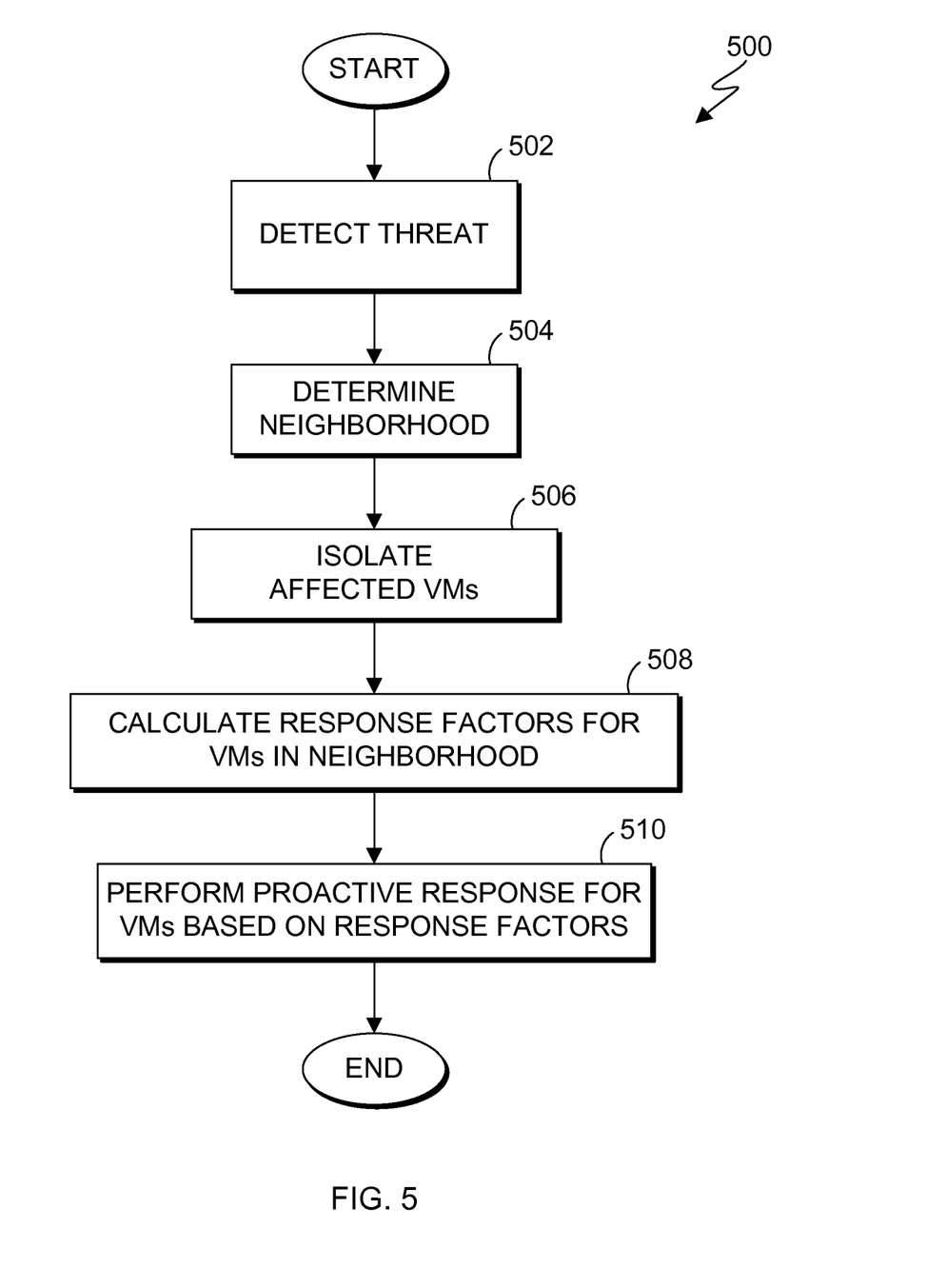
FIG. 5 is a flowchart illustrating operational steps of a process, in accordance with an embodiment of the present invention.

FIG. 5 is a flowchart 500 illustrating operational steps for performing proactive responsive actions on VMs in response to a detected threat, in accordance with an embodiment of the present invention.

In step 502, threat detection module 404 detects a threat in a computing environment and identifies one or more VMs affected by the threat. In this embodiment, as previously discussed, threat detection module 404 detects threats using known techniques. For example, threat detection module 404 can detect unauthorized access to or inappropriate use of one or more of computer systems 408a-n, VMs 410a-n, and VMs 412a-n. In another example, threat detection module 404 can detect a threat related to one or more hypervisors or other resources on computer systems 408a-n.

VMs regarded as being affected by a detected threat (e.g., whether detected automatically by threat detection module 404 or manually identified by a user) can vary based on the nature of the detected threat and specified criteria. For example, for a threat detected for an application executing in one VM (e.g., remote attestation integrity checking by the application indicates a discrepancy), a particular security policy or user may regard the affected VMs as being limited to only the VM executing the application, while another security policy or user may regard the affected VMs as being all VMs accessed or accessible by the compromised application. In another example, a threat may be detected in a hypervisor operating on a particular host computer system. In such a case, a security policy or user may regard the affected VMs as being all VMs managed by that hypervisor.

In step 504, response module 406 determines a neighborhood of VMs that might be affected by the detected threat and affected VMs. In this embodiment, response module 504 determines the logical neighborhood based upon at least logical distance from the one or more affected VMs identified in step 502. Logical distance can be determined using various factors. In this embodiment, logical distance of a given VM from an affected VM is determined based on the extent to which that given VM and the affected VM share resources (e.g., storage, applications, hypervisors, virtual adapters, etc.), share users (e.g., administrative users and/or end users), and share domains and networks (e.g., reside on the same portions of a network). The greater the extent to which the given VM and the affected VM possess these criteria, the shorter the logical distance between those VMs. Logical distance can also be based on factors such as the strength of a given VM (e.g., strength of security controls, where higher strength increases logical distance), and value of a given VM (e.g., monetary value and/or criticality of operations performed by that VM, where higher value decreases logical distance). Logical distance can also influenced by considerations of physical distance (e.g., physical accessibility and proximity of a host computer system of a given VM relative to a potentially compromised host computer system of an affected VM, where increased physical distance also increases logical distance).

Logical distance, and the factors used to determine logical distance, can be quantified with any desired scale. For example, logical distance can be determined as the total number of shared resources, users, and domains. Different types of shared resources, users, and domains can also be weighted differently to reflect a greater or lesser risk of exposing a given VM to threats affecting a compromised VM. For example, shared hypervisors may be weighted more heavily than shared memory, and shared administrative users may be weighted more heavily than shared end users. In this manner, logical distances between VMs that share elements with greater weight will be generally shorter (i.e., reflecting a greater risk of exposing the other VM to the threat) than logical distances between VMs that share elements with lesser weight (i.e., reflecting a lesser risk of exposing the other VM to the threat). In another embodiment, logical distance can be expressed as a binary value (e.g., distant or near) based on whether certain shared elements or combinations of shared elements are present.

Accordingly, in this embodiment, response module 406 can determine the neighborhood of VMs as being those VMs which have a logical distance that satisfies a specified threshold, which can be set based on the scale used and a desired level of security, and which can be used to advantageously identify those VMs which are most susceptible to the detected threat. For example, a neighborhood of VMs can be defined as including all VMs having a logical distance from an affected VM of less than a specified value, where the specified value is increased to define a more expansive neighborhood that encompasses more VMs for increased security (i.e., increasing the number of VMs that might be subject to proactive responsive actions in subsequent processing). In another example, a neighborhood of VMs can be defined as including all VMs having a binary logical distance value of "near", as previously discussed. In other embodiments, other factors and considerations apart from, or in addition to, logical distance can be used to determine the neighborhood of VMs.

In step 506, response module 406 isolates the affected VMs identified in step 502. In this embodiment, isolating the affected VMs involves sandboxing, quarantining, or otherwise disconnecting the affected VMs to advantageously help prevent the detected threat from affecting other VMs. In this manner, response module 406 can isolate affected VMs as a reactionary measure to help contain detected threats while subsequent processing is performed. Response module 406 can isolate the affected VMs from all VMs in the determined neighborhood, from all VMs in the computing environment, or from a specified combination of VMs. In another embodiment, response module 406 can isolate both the affected VMs and all VMs in the determined neighborhood from the remaining VMs in the computing environment.

Isolation of the affected VMs can be accomplished in a variety of ways. For example, where the affected VMs represent a majority of available resources in the computing environment, or where the nature of the threat indicates that the host computer systems on which the affected VMs reside may be compromised (e.g., a hypervisor-level attack), the affected VMs can be isolated from unaffected VMs by off-loading the unaffected VMs from the host computer systems on which the affected VMs reside (i.e., potentially compromised host computer systems) to other host computer systems in the computing environment. Where the affected VMs represent a minority of available resources in the computing environment, and the nature of the threat indicates that the host computer systems on which the affected VMs reside are not compromised (e.g., an attack is expected to remain within an affected VM), the affected VMs can be migrated to other host computer systems in a separately established computing environment, thereby helping to maximize resource allocation by releasing host computer systems that may be used for other processing tasks. Host computer systems to which the affected VMs are migrated can in turn be isolated, such as by using non-shared physical LANs and hypervisors. Furthermore, host computer systems to which the affected VMs are migrated can be subjected to higher security requirements, such as enhanced monitoring and intrusion detection.

In step 508, response module 406 calculates a response factor for each VM in the determined neighborhood. The term "response factor", as used herein, refers to a factor that can be advantageously used to determine what proactive responsive actions should be performed for a particular VM, and a corresponding priority order for performing those actions with respect to other VMs.

In this embodiment, a response factor for a VM is calculated based upon at least the logical distance of that VM (as determined in step 504) from an affected VM and one or more urgency factors that reflect the urgency with which action should be taken for VMs in the determined neighborhood of the affected VM. Both the response factor and urgency factor can be calculated in various ways and according to various criteria. In this embodiment, for example, an urgency factor can be calculated according to the following formula:

$$\text{UrgencyFactor}(VM_{affected}) = Value_1 * Value_2 \ldots * Value_n \quad \text{Formula 1}$$

where UrgencyValue($VM_{affected}$) is the calculated urgency factor for the affected VM, and $Value_1$ through $Value_n$ are assigned numerical values that reflect a degree of risk of a threat spreading from the affected VM to other VMs and the scope of potential impact (e.g., damage and cost) in the event the threat spread to other VMs. In other embodiments, other mathematical formulae (e.g., an additive total) and values can be used to calculate an urgency factor.

In this embodiment, a response factor can be calculated according to the following formula:

$$ResponseFactor(VM_{response}) = \frac{UrgencyFactor(VM_{affected})}{LogicalDistance(VM_{response})} \quad \text{Formula 2}$$

where ResponseFactor($VM_{response}$) is the calculated response factor for the VM to be potentially subjected to proactive responsive actions in response to a detected threat, UrgencyFactor($VM_{affected}$) is the urgency factor for the affected VM calculated according to Formula 1 or another formula, and LogicalDistance($VM_{response}$) is the logical distance between the VM to be potentially subjected to proactive responsive actions and the affected VM. In other embodiments, other mathematical formulae and values can be used to calculate a response factor.

In one embodiment, assigned numerical values used to calculate an urgency factor for an affected VM comprise: a value reflecting a level of confidence in one or more security alerts associated with the detected threats (e.g., confidence that an alert properly identifies the threat, where a higher value indicates greater confidence); a value reflecting strength of the affected VM (e.g., where a higher value indicates greater weakness); a value reflecting the ability of security controls to protect the affected VM (e.g., a higher value indicates weaker security prevention systems and/or the absence of security prevention systems); a value reflecting risk that multi-tenant security controls cannot isolate the affected VM (e.g., a higher value indicates weak multi-tenancy security controls or the absence of security protections at the hypervisor-level, VLAN-level, or router- or firewall-level); and a value reflecting elapsed time since the threat was detected or since the threat occurred, if known (e.g., a value on a logarithmic scale, where a higher value indicates greater elapsed time).

For example, where each of the above values is assigned (e.g., in an automated or manual fashion) on a scale of 1 to 10, a particular affected VM may have a confidence value of 1, a strength value of 5, a protective security control value of 4, a multi-tenant security control value of 3, and an elapsed time value of 1. Using Formula 1, in this example, the affected VM would have a calculated urgency factor of 60. An affected VM having a greater urgency factor would generally indicate a greater urgency for performing proactive responsive actions for VMs in the determined neighborhood of that affected VM, while a lesser urgency factor would generally indicate a lesser urgency for performing proactive responsive actions for VMs in the determined neighborhood of that affected VM.

Individual response factors can then be calculated for each VM in the determined neighborhood of the affected VM based on their individual logical distances from the affected VM. For example, a first VM may have a logical distance of 5, a second VM may have a logical distance of 6, a third VM may have a logical distance of 7, and a fourth VM may have a logical distance of 8. Using Formula 2, in this example, response factors for these four VMs would be 12 (i.e., 60/5), 10 (i.e., 60/6), 8.6 (i.e., 60/7), and 7.5 (i.e., 60/8), respectively. As discussed in greater detail below, in this embodiment, VMs having a greater response factor are typically of greater relative importance and are given higher priority.

Again, these formulae and values are illustrative, and other embodiments can use different formulae and quantitative weighting schemes. Accordingly, modifications can be made to which values are used to calculate urgency factors and response factors, the scale of values calculated for urgency factors and response factors, and the correlation between such values and levels of risk, urgency, or priority of response (e.g., in certain embodiments, calculations can be modified such that lesser response factors are given higher priority). Similarly, in other embodiments, one or more other factors can be calculated and used to determine what proactive responsive actions should be performed for a VM in the determined neighborhood, and a corresponding priority order for performing those actions with respect to other VMs in the determined neighborhood.

In step 510, response module 406 subjects one or more VMs in the neighborhood to one or more proactive responsive actions based on the response factors calculated in step 508. That is, response module 406 performs one or more proactive responsive actions to protect one or more VMs in the determined neighborhood from the detected threat based on the response factors calculated in step 508.

In this embodiment, VMs having a greater response factor are given higher priority in terms of when they are subjected to proactive responsive actions, and may also be subjected to greater proactive responsive actions to ensure they are protected from the detected threat. One or more thresholds can be specified to determine which VMs in the determined neighborhood should be subjected to proactive responsive actions, what those actions should be (e.g., migrating a workload of a VM to another VM, instantiating another VM, migrating a VM to a different host computer system, etc.), and when those actions should be performed relative to other VMs in the determined neighborhood.

In this embodiment, response module 406 can determine the VMs to be subjected to proactive responsive actions as those VMs in the determined neighborhood which have a response factor that satisfies a specified threshold, which can be set based on the scale used and a desired level of security. For example, in a scenario involving the VMs having calculated response factors on a scale of 1 to 100, a user or security policy can specify a threshold of 40, such that only VMs in the determined neighborhood having a response factor greater than or equal to 40 will be subjected to proactive responsive actions in response to detected threats. For increased security (i.e., greater caution), that threshold can be lowered; for decreased security (i.e., lesser caution), that threshold can be raised.

Similarly, response module 406 can determine which proactive responsive actions to perform on VMs in the determined neighborhood based on specified thresholds. For example, a user or security policy can specify a first threshold of 50, such that workloads on VMs in the determined neighborhood having a response factor greater than or equal to 40, and less than or equal to 50, can be proactively migrated to another VM on the same host computer system; a second threshold of 60 can be specified such that VMs in the determined neighborhood having a response factor greater than or equal to 50, and less than or equal to 60, are proactively migrated to another host computer system; a third threshold can be specified such that VMs in the determined neighborhood having a response factor greater than 60 are required to be proactively migrated to another host computer system that has heightened security controls.

In this embodiment, response module 406 performs proactive responsive actions for VMs in order of their priority, which is also based on their response factors. In this example, VMs having a greater response factor are first subjected to proactive responsive actions, followed by VMs having a lesser response factor. Such priority order determinations can be modified based on different correlations between desired priority and response factors, which may result when different formulae and values are used.

Accordingly, by performing the operational steps of FIG. 5, threat detection module 404 and response module 406 can advantageously detect a threat affecting one or more VMs in a computing environment, determine a neighborhood of VMs relative to the one or more affected VMs, and subject one or more of VMs in the neighborhood to proactive responsive actions to protect those VMs in a selective and prioritized manner.

Figure 6:
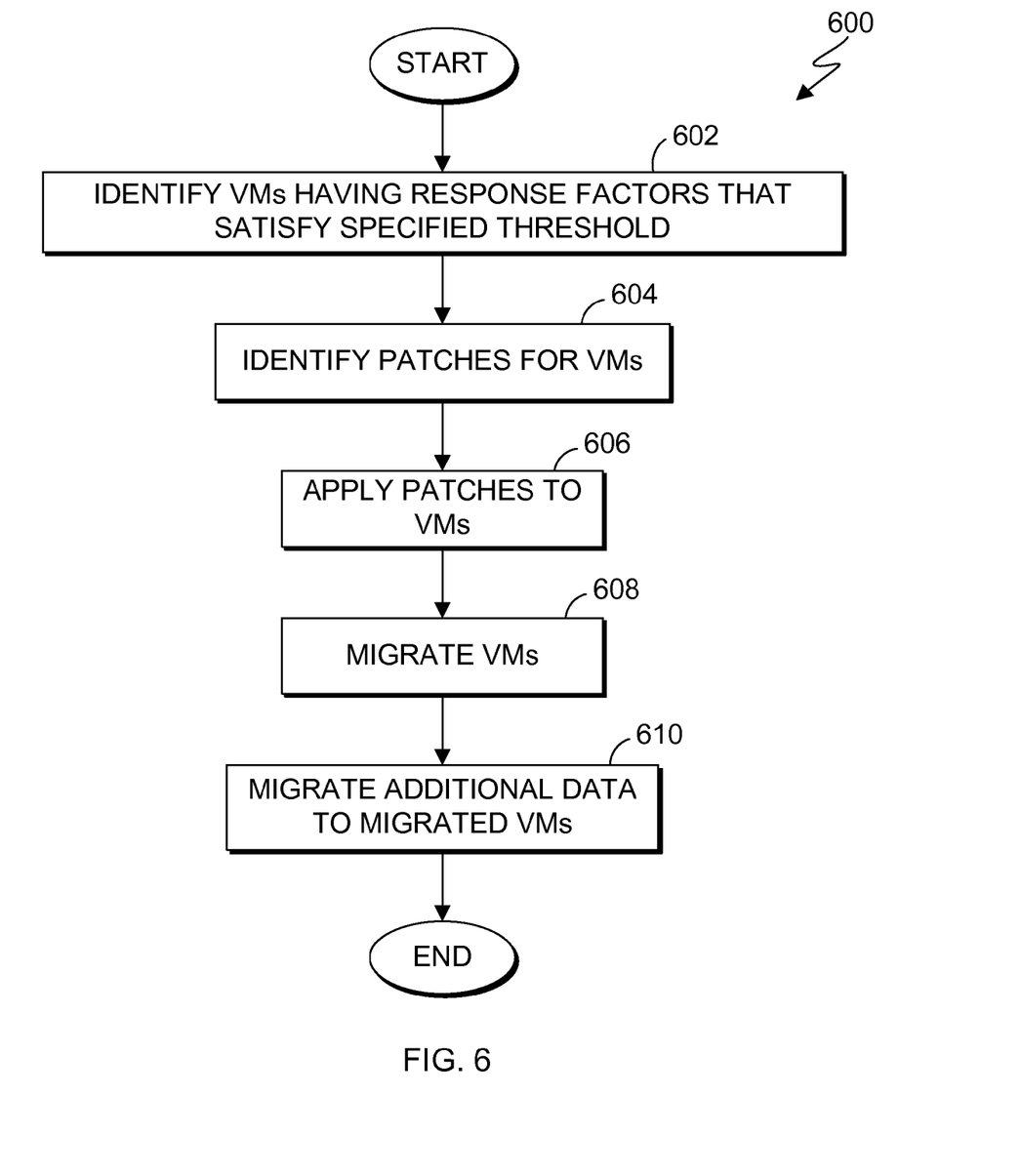
FIG. 6 is a flowchart illustrating operational steps of a process, in accordance with an embodiment of the present invention.

FIG. 6 is a flowchart 600 illustrating operational steps for proactively migrating VMs, in accordance with an embodiment of the present invention. The operational steps of FIG. 6 can be performed, for example, as proactive responsive actions at step 510 of FIG. 5.

In step 602, response module 406 identifies VMs having individual response factors that satisfy a specified threshold. In this embodiment, response module 406 identifies VMs found in a determined neighborhood of VMs of an affected VM (e.g., step 504 of FIG. 5). The specified threshold is established by a user or security policy such that response module 406 will proactively migrate VMs having individual response factors that satisfy (e.g., exceed) the specified threshold.

In step 604, response module 406 identifies patches (or other remedies) for the VMs identified in step 602. In this embodiment, response module 406 can consult a local or remote resource (e.g., database) to identify any known patches for the detected threats on the affected VM and, in step 606, response module 406 can apply those patches to the identified VMs to be proactively migrated. For example, the detected threat on the affected VM may involve malicious exploitation of a vulnerability in the affected VM for which there is a patch available. In steps 604 and 606, response module 406 can advantageously identify and apply the patch to the VMs to be proactively migrated (i.e., patch the vulnerability in the VM system images).

In step 608, response module 406 migrates the identified VMs to one or more other host computer systems. Response module 406 advantageously migrates the identified VMs in a prioritized manner based on their individual response factors, such that VMs having the highest priority are migrated first. For example, where a greater response factor correlates to a greater priority, response module 406 first migrates the identified VM having the highest response factor and continues in descending order. In this embodiment, response module 406 migrates the identified VMs, whether patched or unpatched. In other embodiments, response module 406 can wait to migrate an identified VM until a patch is available and successfully applied to that VM. In embodiments where response module 406 is integrated in a computing environment not managed by an end-user (e.g., a commercial cloud service), the manager of the computing environment (e.g., cloud provider) may have the ability to migrate the identified VMs on behalf of the end-user. Where an end-user manages the computing environment, response module 406 can notify the end-user of updates needed to be made to one or more VMs, availability of host computer systems and other resources in computing environments, and other information needed for the end-user to migrate their VMs and workloads.

In step 610, response module 406 migrates any additional data, as needed, to the redeployed VMs. For example, user and/or application data of the VM in the old computing environment can be migrated to the redeployed VM in a new computing environment.

The present invention may be a system, a method, and/or a computer program product. In another embodiment, the invention provides a method that performs the process of the invention on a subscription, advertising, and/or fee basis. That is, a service provider, such as a Solution Integrator, could offer to provide functionality for responding to threats affecting virtual machines. In this case, the service provider can create, maintain, support, etc., a computer infrastructure, such as computer system 100 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for responding to threats affecting virtual machines. In this case, a computer infrastructure, such as computer system 100 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 100 (FIG. 1), from a computer readable storage medium; (2) adding one or more computing devices to the computer infrastructure; and (3) incorporating and/or modifying one or more existing systems of the computer infrastructure to enable the computer infrastructure to perform the processes of the invention.

The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for responding to a threat affecting a virtual machine, comprising:
    detecting, by one or more computer processors, a threat affecting a first virtual machine;
    responsive to detecting the threat affecting the first virtual machine, determining, by one or more computer processors, a neighborhood of the first virtual machine comprising one or more virtual machines that might be affected by the detected threat;
    calculating, by one or more computer processors, a response factor for each virtual machine in the determined neighborhood;
    determining, by one or more computer processors, a first responsive action to perform to protect a second virtual machine in the determined neighborhood from the detected threat based at least on the calculated response factor for the second virtual machine;
    determining, by one or more computer processors, a second responsive action to perform to protect a third virtual machine in the determined neighborhood from the detected threat based at least on the calculated response factor for the third virtual machine;
    determining, by one or more computer processors, an order in which to perform the first responsive action and second responsive action based upon at least the calculated response factors for the second virtual machine and the third virtual machine; and
    performing, by one or more computer processors, the first responsive action and the second responsive action in the determined order.

2. The method of claim 1, wherein the neighborhood is determined based upon at least logical distances between the first virtual machine and the one or more virtual machines that might be affected by the detected threat.

3. The method of claim 2, wherein a logical distance between the first virtual machine and the second virtual machine is calculated based upon at least an extent to which the first virtual machine and the second virtual machine share resources, users, domains, networks, storage, applications, hypervisors, and virtual adapters.

4. The method of claim 1, wherein the first responsive action comprises migrating the second virtual machine to another host computer system, and the second responsive action comprises migrating a workload of the third virtual machine to another virtual machine on a same host computer system as the third virtual machine.

5. The method of claim 4, wherein the first responsive action is determined based on the calculated response factor for the second virtual machine satisfying a specified threshold that is not satisfied by the calculated response factor for the third virtual machine.

6. The method of claim 1, wherein the calculated response factor for each particular virtual machine reflects an urgency with which action should be taken to protect that particular virtual machine from the detected threat.

7. The method of claim 1, wherein the response factor for each particular virtual machine is calculated based upon at least a logical distance between that particular virtual machine and the first virtual machine, and one or more numerical values that reflect a degree of risk of the detected threat spreading from the first virtual machine to that particular virtual machine.

8. The method of claim 1, wherein calculating, by one or more computer processors, a response factor for each virtual machine in the determined neighborhood comprises:
   calculating, by one or more computer processors, an urgency factor for the first virtual machine based upon at least a value reflecting a level of confidence in one or more security alerts associated with the detected threat, a value reflecting strength of the first virtual machine, a value reflecting an ability of security controls to protect the first virtual machine, a value reflecting risk that multi-tenant security controls cannot isolate the first virtual machine, and a value reflecting elapsed time since the detected threat was detected or since the detected threat occurred; and
   calculating, by one or more computer processors, for each particular virtual machine in the determined neighborhood, the response factor for that particular virtual machine based upon at least a logical distance between that particular virtual machine and the first virtual machine and the urgency factor for the first virtual machine.

9. A computer program product for responding to a threat affecting a virtual machine, comprising:
   one or more computer readable storage media and program instructions stored on the one or more computer readable storage media, the program instructions comprising:
      program instructions to detect a threat affecting a first virtual machine;
      program instructions to, responsive to detecting the threat affecting the first virtual machine, determine a neighborhood of the first virtual machine comprising one or more virtual machines that might be affected by the detected threat;
      program instructions to calculate a response factor for each virtual machine in the determined neighborhood;
      program instructions to determine a first responsive action to perform to protect a second virtual machine in the determined neighborhood from the detected threat based at least on the calculated response factor for the second virtual machine;
      program instructions to determine a second responsive action to perform to protect a third virtual machine in the determined neighborhood from the detected threat based at least on the calculated response factor for the third virtual machine;
      program instructions to determine an order in which to perform the first responsive action and second responsive action based upon at least the calculated response factors for the second virtual machine and the third virtual machine; and
      program instructions to perform the first responsive action and the second responsive action in the determined order.

10. The computer program product of claim 9, wherein the neighborhood is determined based upon at least logical distances between the first virtual machine and the one or more virtual machines that might be affected by the detected threat.

11. The computer program product of claim 10, wherein a logical distance between the first virtual machine and the second virtual machine is calculated based upon at least an extent to which the first virtual machine and the second virtual machine share resources, users, domains, networks, storage, applications, hypervisors, and virtual adapters.

12. The computer program product of claim 9, wherein the first responsive action comprises migrating the second virtual machine to another host computer system, and the second responsive action comprises migrating a workload of the third virtual machine to another virtual machine on a same host computer system as the third virtual machine.

13. The computer program product of claim 12, wherein the first responsive action is determined based on the calculated response factor for the second virtual machine satisfying a specified threshold that is not satisfied by the calculated response factor for the third virtual machine.

14. The computer program product of claim 9, wherein the calculated response factor for each particular virtual machine reflects an urgency with which action should be taken to protect that particular virtual machine from the detected threat.

15. The computer program product of claim 9, wherein the response factor for each particular virtual machine is calculated based upon at least a logical distance between that particular virtual machine and the first virtual machine, and one or more numerical values that reflect a degree of risk of the detected threat spreading from the first virtual machine to that particular virtual machine.

16. The computer program product of claim 9, wherein the program instructions to calculate a response factor for each virtual machine in the determined neighborhood comprises:
   program instructions to calculate an urgency factor for the first virtual machine based upon at least a value reflecting a level of confidence in one or more security alerts associated with the detected threat, a value reflecting strength of the first virtual machine, a value reflecting an ability of security controls to protect the first virtual machine, a value reflecting risk that multi-tenant security controls cannot isolate the first virtual machine, and a value reflecting elapsed time since the detected threat was detected or since the detected threat occurred; and
   program instructions to calculate, for each particular virtual machine in the determined neighborhood, the response factor for that particular virtual machine based upon at least a logical distance between that particular virtual machine and the first virtual machine and the urgency factor for the first virtual machine.

17. A computer system for responding to a threat affecting a virtual machine, comprising:
   one or more hardware computer processors;
   one or more computer readable storage media; and
   program instructions stored on the one or more computer readable storage media for execution by at least one of the one or more processors, the program instructions comprising:
      program instructions to detect a threat affecting a first virtual machine;
      program instructions to, responsive to detecting the threat affecting the first virtual machine, determine a neighborhood of the first virtual machine comprising one or more virtual machines that might be affected by the detected threat;
      program instructions to calculate a response factor for each virtual machine in the determined neighborhood;
      program instructions to determine a first responsive action to perform to protect a second virtual machine in the determined neighborhood from the detected threat based at least on the calculated response factor for the second virtual machine;

program instructions to determine a second responsive action to perform to protect a third virtual machine in the determined neighborhood from the detected threat based at least on the calculated response factor for the third virtual machine;

program instructions to determine an order in which to perform the first responsive action and second responsive action based upon at least the calculated response factors for the second virtual machine and the third virtual machine; and program instructions to perform the first responsive action and the second responsive action in the determined order.

18. The computer system of claim 17, wherein the neighborhood is determined based upon at least logical distances between the first virtual machine and the one or more virtual machines that might be affected by the detected threat.

19. The computer system of claim 18, wherein a logical distance between the first virtual machine and the second virtual machine is calculated based upon at least an extent to which the first virtual machine and the second virtual machine share resources, users, domains, networks, storage, applications, hypervisors, and virtual adapters.

20. The computer system of claim 17, wherein the first responsive action comprises migrating the second virtual machine to another host computer system, and the second responsive action comprises migrating a workload of the third virtual machine to another virtual machine on a same host computer system as the third virtual machine.

21. The computer system of claim 20, wherein the first responsive action is determined based on the calculated response factor for the second virtual machine satisfying a specified threshold that is not satisfied by the calculated response factor for the third virtual machine.

22. The computer system of claim 17, wherein the calculated response factor for each particular virtual machine reflects an urgency with which action should be taken to protect that particular virtual machine from the detected threat.

23. The computer system of claim 17, wherein the response factor for each particular virtual machine is calculated based upon at least a logical distance between that particular virtual machine and the first virtual machine, and one or more numerical values that reflect a degree of risk of the detected threat spreading from the first virtual machine to that particular virtual machine.

24. The computer system of claim 17, wherein the program instructions to calculate a response factor for each virtual machine in the determined neighborhood comprises:

program instructions to calculate an urgency factor for the first virtual machine based upon at least a value reflecting a level of confidence in one or more security alerts associated with the detected threat, a value reflecting strength of the first virtual machine, a value reflecting an ability of security controls to protect the first virtual machine, a value reflecting risk that multi-tenant security controls cannot isolate the first virtual machine, and a value reflecting elapsed time since the detected threat was detected or since the detected threat occurred; and program instructions to calculate, for each particular virtual machine in the determined neighborhood, the response factor for that particular virtual machine based upon at least a logical distance between that particular virtual machine and the first virtual machine and the urgency factor for the first virtual machine.

* * * * *